Nov. 12, 1963

H. R. HULETT ETAL 3,110,812

SPACE VEHICLE ANGULAR RATE AND ORBITING
VEHICLE YAW ATTITUDE SENSOR

Filed Oct. 9, 1959

INVENTORS
HENRY R. HULETT
WILLIAM SNYDER
HAROLD A. ELLIOTT
By: *[signature]*

ATTORNEYS

INVENTORS
HENRY R. HULETT
WILLIAM SNYDER
HAROLD A. ELLIOTT

ATTORNEYS

INVENTORS
HENRY R. HULETT
WILLIAM SNYDER
HAROLD A. ELLIOTT

BY: *Mellin and Hanscom*

ATTORNEYS

United States Patent Office 3,110,812
Patented Nov. 12, 1963

3,110,812
SPACE VEHICLE ANGULAR RATE AND ORBITING VEHICLE YAW ATTITUDE SENSOR
Henry R. Hulett, Portola Valley, William Snyder, Palo Alto, and Harold A. Elliott, East Palo Alto, Calif., assignors to American Radiator & Standard Sanitary Corporation, New York, N.Y., a corporation of Delaware
Filed Oct. 9, 1959, Ser. No. 845,543
5 Claims. (Cl. 250—203)

This invention relates to and in general has for its objects the provision of angular rate sensing in space vehicles and angular rate sensing and yaw attitude sensing in orbital vehicles.

Since a space vehicle is subject to rotation (pitch, roll, and yaw) about any one or more of its three reference axes (pitch, roll, and yaw axes) it is often imperative to know the rate of rotation of the vehicle about each of these axes.

It is also often imperative to know the yaw attitude of a horizontally stabilized vehicle orbiting about a heavenly body.

As will more clearly appear from the following description, we have found that space vehicle angular rates and, in the case where the space vehicle is horizontally stabilized in an orbit, yaw attitude can be ascertained by sensing the apparent motion of the star field with respect to the space vehicle axes.

More specifically, one of the objects of this invention is the provision of an attitude and/or rate sensor including: an optical system for directing a beam of light from a star field to a photomultiplier cell; and means forward of said cell for chopping said beam, said means being capable of discriminating between a clockwise and counterclockwise angularity of the vehicle relative to one of its three reference axes.

Another object of this invention is the provision of an attitude and/or rate sensor of the character above described wherein means associated with the optical system is provided for oscillating the beam of light entering the photomultiplier cell in a direction paralleling a given vehicle axis and wherein said chopping means includes a reticle provided with alternate, parallel opaque bands and slits of known width and arranged to be crossed by said beam of light.

A further object of this invention is the provision of a yaw attitude-sensor including a reticle, a photoelectric cell, and means for directing a beam of light through the reticle and into said photoelectric cell, said reticle including at least one pair of divergent slits separated by an opaque band.

Still another object of this invention is the provision of a yaw attitude-sensor including: first and second reticles, first and second photoelectric cells, and first and second telescopes arranged to be mounted on an orbiting vehicle in parallelism with the yaw axis of the vehicle and each arranged to direct a beam of light from a star crossing its field, through one of said reticles, each of said reticles including a set of spaced, parallel slits or windows, the windows of one reticle being disposed at an angle relative to the windows of the other reticle, and said windows preferably being symmetrically arranged relative to said yaw axis.

Another object of this invention is the provision of an attitude-sensor of the character above described wherein each of said reticles is provided with a set of parallel windows and alternate opaque bands of dissimilar width, wherein the center-to-center spacing of the windows of one reticle is equal to the center-to-center spacing of the bands of the other reticle, and wherein the windows and bands of one reticle are disposed at an angle relative to the windows and bands of the other reticle.

Another object of this invention is the provision of an attitude-sensor of the character above described wherein said optical system is in the form of a reflecting telescope including a primary aspheric mirror and a secondary aspheric mirror, and wherein means is provided for oscillating said mirror about an axis paralleling the slits or windows of the reticle.

The invention possesses other advantageous features, some of which, with the foregoing, will be set forth at length in the following description where those forms of the invention which have been selected for illustration in the drawings accompanying and forming a part of the present specification are outlined in full. In said drawings, several forms of the invention are shown, but it is to be understood that it is not limited to such forms, since the invention as set forth in the claims may be embodied in other forms.

Referring to the drawings.

Figure 1:
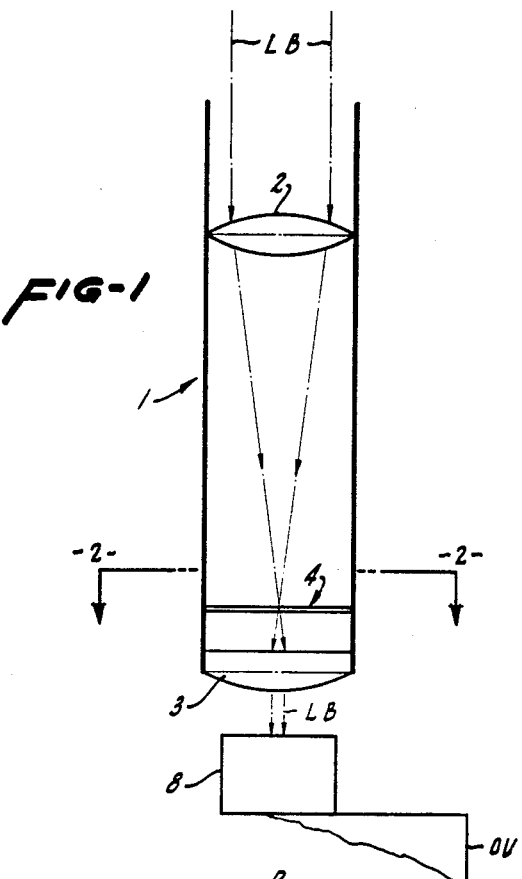
FIG. 1 is a schematic representation in front elevation of a first modification of a yaw attitude-sensor embodying the objects of our invention and wherein the reticle of the sensor includes a pair of symmetrically arranged windows separated by an opaque band. Although refractive optics are illustrated, reflective optics could, of course, be substituted.
Figure 2:
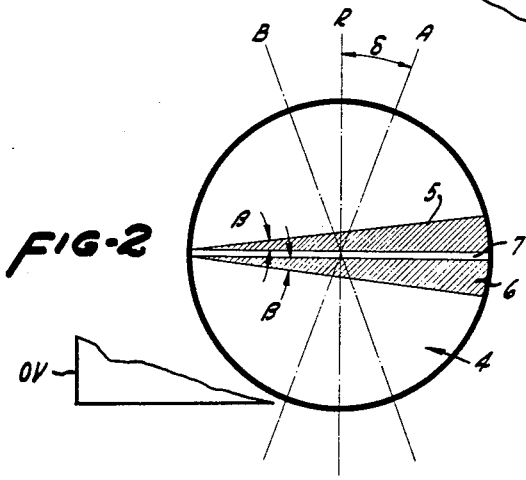
FIG. 2 is a horizontal section taken on the line 2—2 of FIG. 1.
Figure 3:
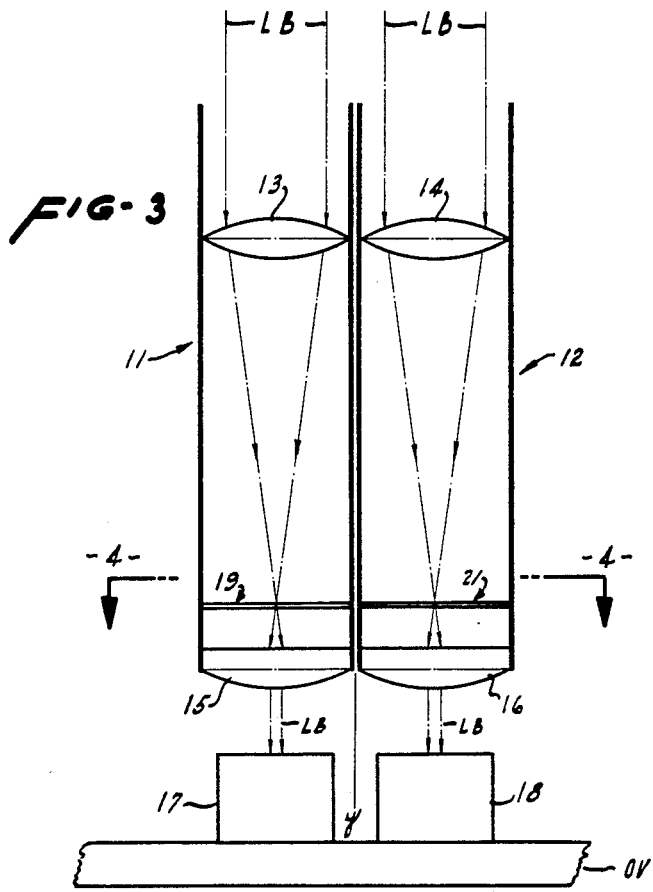

FIG. 3 is a schematic representation in front elevation of a second modification of the sensor shown in FIGS. 1 and 2, wherein two optical systems, two reticles, and two photoelectric cells are used and wherein the slits of the two reticles are angularly disposed but symmetrically arranged relative to the roll axis of the vehicle. Although refractive optics are illustrated, reflective optics could, of course, be used also.

Figure 4:
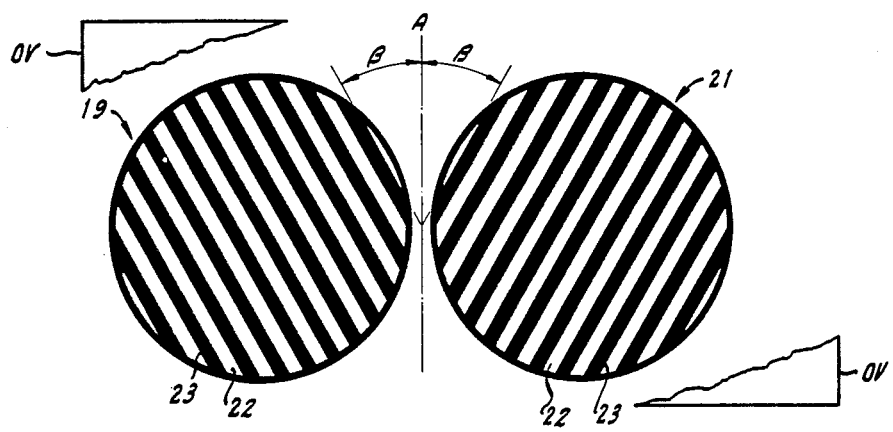

FIG. 4 is a horizontal section taken on the section line 4—4 of FIG. 3.

Figure 5:
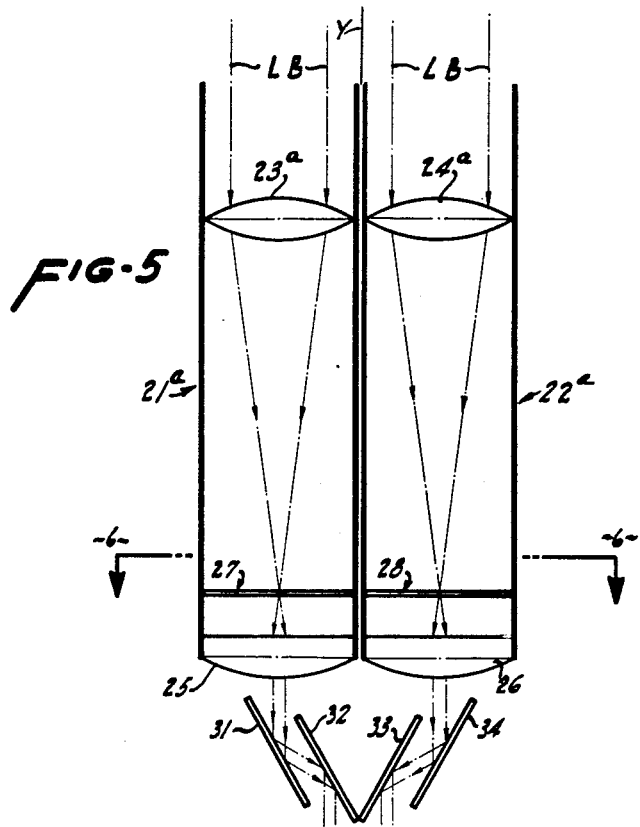

FIG. 5 is a schematic representation in vertical elevation of a third modification of our invention wherein a single photoelectric cell but two telescopes and two reticles are used, and wherein the reticles are conjugates of each other and symmetrically oriented relative to the roll axis of the vehicle. Reflective optics could, of course, be used instead of the refractive optics illustrated.

Figure 6:
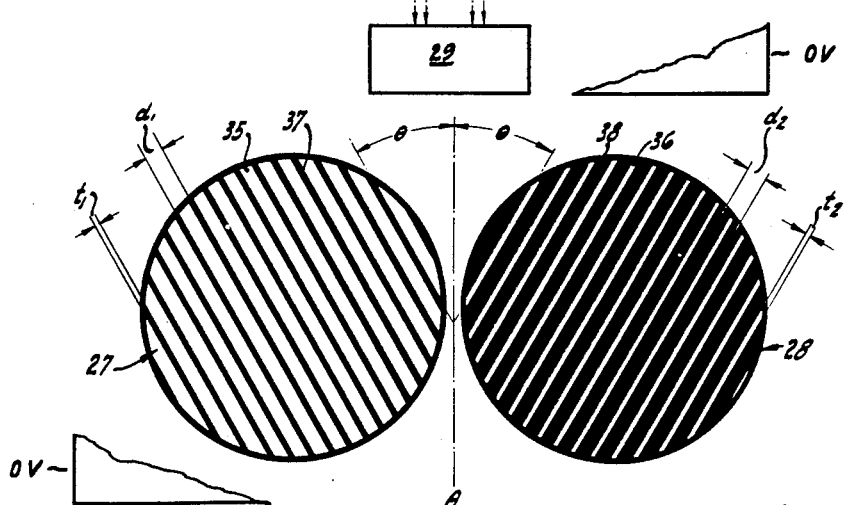

FIG. 6 is a horizontal section taken on the section line 6—6 of FIG. 5.

Figures 7, 8:
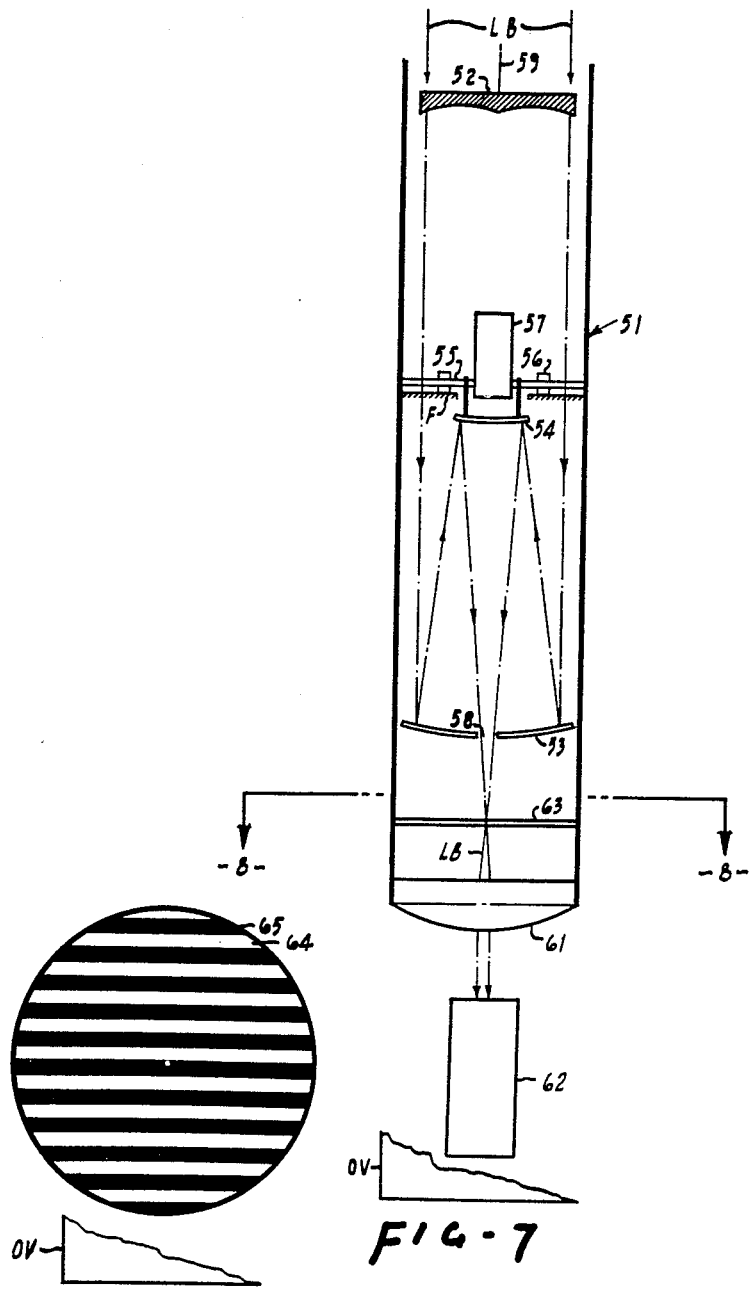

FIG. 7 is a schematic representation in vertical elevation of a fourth modification of our invention which is additionally useful for sensing the rate of rotation of a vehicle and wherein the optical system of the device is in the form of a reflecting telescope, and wherein an oscillating mirror is provided for laterally deflecting the star image beam prior to its passage to the photoelectric cell of the device. An optical system utilizing refractive optics could, of course, be substituted for the reflective system shown.

FIG. 8 is a horizontal section taken on the section line 8—8 of FIG. 7.

Preliminarily it should be noted that in determining the degree and direction of yaw of a horizontally stabilized orbiting vehicle, advantage is taken of the apparent movement of the star field as viewed along the yaw axis of the vehicle and which results from the actual rotation of the vehicle about an axis in its horizontal plane as it moves along its orbit. Such movement can be likened to the apparent rotation of stars resulting from the actual rotation of the earth about its own axis. Here it should also be observed that due to the insignificance of any such distances in the order of the diameter of the earth's orbit relative to the distance between the earth and even the nearest star, any two lines drawn between any star and any two points of the earth's orbit can be considered as parallel lines. The same observation holds true between any two lines drawn between any star and any two points on the orbit of a vehicle in orbit about the earth.

Now referring to the yaw sensor illustrated in FIGS. 1 and 2 and which includes a telescope generally designated by the reference numeral 1 and arranged to be mounted on an orbiting vehicle OV in parallelism with the yaw axis thereof:

Included in the telescope 1 is an objective lens 2 and a field lens 3.

Disposed in the focal plane of the telescope 1 is a reticle 4. As illustrated in FIG. 2 the reticle 4 is provided with a pair of identical transparent sectors or windows 5 and 6 symmetrically disposed on either side of a diametral opaque band 7 of uniform width. Each of the transparent sectors 5 and 6 is subtended by an angle $\beta$. Here it should be noted that the telescope 1 should be so mounted on the vehicle that the band 7 be normal to the roll axis R of the vehicle. In the event of no error in yaw, the axis R is tangent to the orbit of the vehicle.

Located beneath the field lens 3 and in registration therewith is a photoelectric cell 8 arranged to receive light beams LB from the telescope as restricted by the transparent sectors or windows 5 and 6. If the roll axis of the vehicle lies in the orbital plane, the apparent trajectory of the light beam LB across the two sectors or windows 5 and 6 will be normal to the band 7 and consequently the intervals during which the beam of light is passing through the two windows will be identical. If the vehicle yaws counterclockwise so that the tangent to the orbit assumes a position along the line A, the period of light passage through the sector 5 will be greater than that through the sector 6. If, on the other hand, the yaw is clockwise the reverse will be true. These conditions can, of course, be sensed by the photoelectric cell 8 and transmitted to any suitable translating device.

From geometrical considerations, it can be shown that:

$$\frac{P_2}{P_1} = \frac{1 + \tan \beta \tan \delta}{1 - \tan \beta \tan \delta}$$

Where $P_1$ and $P_2$ are the pulse width in windows 5 and 6 respectively, $\delta$ is the yaw angle (considered positive for clockwise yaw and negative for counterclockwise yaw), and B is the apex angle of the windows 5 and 6. From this it follows that:

$$\tan \delta = \frac{1}{\tan \beta} \left( \frac{P_2 - P_1}{P_2 + P_1} \right)$$

$$\delta = \tan^{-1} \left[ \frac{1}{\tan \beta} \left( \frac{P_2 - P_1}{P_2 + P_1} \right) \right]$$

Although this relationship holds true for all yaw angles somewhat less than $90° - \beta$, it is appreciated that corrections will have to be made for yaw angles approaching 90° and greater angles.

Although not shown, the photoelectric cell 8 can be connected to a computor for solving the above equations.

Although only one reticle configurtaion has been here illustrated, it is of course possible to resort to others which will produce the same general result as the modification here shown.

Also it is to be observed that the photoelectric cell 8 can take various forms, such as, for example, photoconductive, photovoltaic, and photoemissive detectors.

Although as herein illustrated and described, the telescope 1 has been mounted on the orbiting vehicle OV in parallelism with the yaw axis of the vehicle, this is not essential, for if the telescope is mounted at a known angle to the yaw axis of the vehicle, its vertical or yaw axis component can be readily calculated. The same holds true for the reticle 4.

As illustrated in FIGS. 3 and 4, the objects of our invention have been embodied in a yaw attitude sensor including first and second telescopes generally designated by the reference numerals 11 and 12 and arranged to be mounted on an orbiting vehicle OV in parallelism with the yaw axis Y thereof but not necessarily coaxially therewith.

The telescopes 11 and 12 include identical objective lenses 13 and 14 and identical field lenses 15 and 16. Disposed in registration with the lenses 15 and 16 are identical photoelectric cells 17 and 18.

Embodied in the telescopes 11 and 12 in the focal planes thereof are reticles 19 and 21, each provided with a plurality of parallel windows 22 of equal width, separated by alternate parallel opaque bands 23 of equal width. The only difference between the two reticles 19 and 21 is that the windows of one are disposed at an angle $2\beta$ relative to the windows of the other reticle. Furthermore, the reticles should be symmetrically mounted relative to the two telescopes. In other words, the two reticles are positioned so that nominally the windows of one reticle are rotated a small angle $\beta$ clockwise from the roll axis of the vehicle about its yaw axis, while the windows of the other telescope are rotated through the same angle, but counterclockwise.

As a star image crosses the field of view (common to both telescopes), a series of pulses is generated in each of the photoelectric cells 17 and 18. If the yaw error is zero, the time required for light to cross the windows of one reticle will be identical to the time required for the light to cross the windows of the other reticle, and consequently the two photoelectric cells will be identically influenced.

However, if the vehicle deviates from zero yaw, the time required for a star image to cross the windows of one reticle will differ from the time required for the star image to cross the windows of the other reticle.

Furthermore, it can be shown that $$\frac{T_1 - T_2}{T_1 + T_2} = -\operatorname{ctn} \beta \tan \delta$$

where:

$T_1$ and $T_2$ are the times required for the star image to cross the windows of the reticles 19 and 21 respectively;

$\delta$ = the yaw angle of the vehicle (positive for clockwise yaw and negative for counterclockwise yaw), and $\beta$ is that angle of the windows 22 relative to the common tangent line A.

By electronically computing the term $$\frac{T_1 - T_2}{T_1 + T_2}$$

the readout can be made proportional to $\tan \delta$ and, for small angles, proportional to $\delta$.

Although the sensitivity of the yaw read-out is proportional to $\operatorname{ctn} \beta$, if $\beta$ is made too small, it will not be possible for a star image to cross one of the windows 22 before passing out of the field of view. Therefore, the actual choice of $\beta$ will depend upon these considerations and the required sensitivity for a given system.

It should here be noted that this technique does not require continuous monitoring of stellar information. Whenever a star image is passing through the field, the information is derived and can be used. Whenever a star is sighted, information on both the direction and the magnitude of the yaw error is derived. Interpolating between such sightings should give quite an accurate indication of attitude versus time.

The photoelectric cells 17 and 18 can take various forms, such as, for example, photoconductive, photovoltaic, and photoemissive detectors.

Although only one reticle configuration has been here illustrated, it is of course possible to resort to others which will produce the same general result as the configuration here shown.

Although two telescopes have been here illustrated, it is of course possible to use a single telescope together with beam-splitting means which divide the received light and form two focal planes. The reticles are placed in the two focal planes of the single telescope in the same manner as here described for the two telescopes.

Here again it is to be noted that the optical system is mounted in parallelism with the yaw axis Y of the vehicle merely for purposes of simplification, and that so long as the yaw axis component of the actual axis of the optical system can be calculated, the optical system can be tilted relative to the axis Y. The same of course also hold true with respect to the reticles 19 and 21. Tilting the reticle merely foreshortens the width of its slits and opaque bands.

The yaw sensor illustrated in FIGS. 5 and 6 includes first and second telescopes generally designated by the reference numerals 21ª and 22ª and mounted on the orbiting vehicle OV in parallelism with its yaw axis Y. Provided in each of these telescopes are objective lenses 23ª and 24ª and field lenses 25 and 26. Located in the focal planes of the telescopes 21ª and 22ª, respectively, are reticles 27 and 28, the characteristics of which will be presently described.

Symmetrically located relative to the lower end of the telescopes 21ª and 22ª is a photoelectric cell 29. Disposed between this cell and the field lens 25 are a pair of parallel mirrors 31 and 32 set at 45° angles to the axes of the telescopes and arranged to reflect beams of light LB from the telescopes into the photoelectric cell 29. Similarly disposed between the photoelectric cell 29 and the field lens 26 are a pair of parallel mirrors 33 and 34 arranged to reflect beams of light from the telescope 22 into the common photoelectric cell 29.

As best shown in FIG. 6, the reticles 27 and 28 are respectively provided with a plurality of parallel windows 35 and 36 respectively spaced by alternate opaque bands 37 and 38. The windows and bands of each reticle each make a small angle $\theta$ with the common tangent line A (roll axis) of the two telescopes. Although as so far described the two reticles are identical and symmetrically arranged relative to the telescopes 21ª and 22ª, here the following important differences and relationships between them should be noted. The width $t_1$ of the opaque bands 37 should be equal to the width $t_2$ of the windows 36 and the center-to-center spacing $d_1$ between the bands 37 should be equal to the center-to-center distance $d_2$, between the opaque bands 38. In other words $$t_1 = t_2$$

and $$d_1 = d_2$$

Now, if $t_1$ is small as compared to $d_1$, a series of negative pulses will be generated at the photoelectric cell output as the image of a star "drifts" across the field of telescope 21ª, provided the drift direction is not parallel with the opaque bands of the reticle. Simultaneously, and bearing in mind that the reticle 28 is the conjugate of the reticle 27 in so far as its window pattern is concerned, the star image drifting across the field of telescope 22ª will generate a series of positive pulses at the photoelectric cell output. With a zero yaw error the number of negative pulses will be equal to the number of positive pulses. However, if the vehicle yaws to the left, the number of negative pulses will exceed the number of positive pulses and, similarly, if the vehicle yaws to the right, the number of positive pulses will exceed the number of negative pulses.

It can be shown that:

$$R = \frac{\sin(\theta + \delta)}{\sin(\theta - \delta)}$$

where:

R is the ratio of the number of negative pulses to the number of positive pulses in a given time, $\theta$ = the angle between the reticle bands for each telescope and the roll axis, $\delta$ = yaw error, the error being positive for counterclockwise yaw and negative for clockwise yaw.

Hence, by electronically separating pulses of opposite polarity, counting the pulses and determining the ratio R, a read-out of yaw error and its direction can be obtained.

The photoelectric cell 29 can take various forms, such as, for example, photoconductive, photovoltaic, and photoemissive detectors.

Although only one reticle configuration has been here illustrated, it is of course possible to resort to others which will produce the same general result as the configuration here shown.

Although two telescopes have been here illustrated, it is of course possible to obtain the same general result by means of a single telescope together with beam-splitting means which permit forming half of the light into each of two separate focal planes.

In the modification of our yaw attitude and/or rate sensor illustrated in FIGS. 7 and 8, the optical system is shown in the form of a reflecting telescope generally designated by the reference numeral 51 and which includes a refracting corrector plate 52, a primary aspheric mirror 53, and an oscillating secondary aspheric mirror 54. The mirror 54 is mounted for oscillation on a shaft 55 journaled in bearings 56 fixed to the telescope frame F, and oscillation of the shaft and the mirror 54 is effected by a conventional torsion motor 57. Formed in the primary mirror 53 is a central aperture 58 and located beneath the mirror 53 in line with the axis 59 of the telescope is a condensing lens 61.

Mounted beneath the lens 61 on the axis 59 is a photoelectric or photomultiplier tube 62 arranged to receive a light beam LB from the star field to which the telescope is directed.

Located at the focal point of the telescope is a reticle 63 provided as best shown in FIG. 8 with a plurality of parallel slits 64 separated by alternate opaque bands 65. Preferably the plane of the reticle 63 should be arranged normal to the telescope axis with its slits and opaque bands in parallelism with the shaft 55.

As a result of this structure a light beam LB from the star field is reflected by the secondary mirror 54 through the aperture 58, through the slits of the recticle 63 and through the condensing lens 61. Since the secondary mirror is oscillating, it will impart to the light beam reflected by it, a lateral displacement (in and out of the plane of the drawing as viewed in FIG. 7), and this laterally shifting beam will be "chopped" as a result of passing through the reticle and be sensed by the photomultiplier tube as a rectangular wave. For the purpose of ascertaining the rate of rotation of the vehicle, the telescope should be mounted with its axis normal to the axis of the vehicle about which rates are to be measured and with the slits parallel to the vehicle axis. The secondary mirror 54 displaces its reflected beam alternately in the direction of rotation of the vehicle and contrariwise across the rectile slits. The nature of the oscillation of the secondary mirror 54 should be such that the plot of the displacement velocity versus time approximates a rectangular wave, and the oscillation amplitude should be sufficient to effect a displacement of the star image across at least several of the slits 64 in the reticle. If, as above indicated, the vehicle has a rate of rotation about the axis in question, the signal frequency is modulated, for in one-half of a cycle of oscillation of the secondary mirror the apparent star velocity due to the vehicle velocity adds to mirror oscillation velocity, and in the other half of the cycle it subtracts from the mirror oscillation velocity. This frequency modulation can be detected by conventional means associated with the photomultiplier cell 62 (but not shown) to provide a signal proportional to the magnitude and direction of the rate of rotation of the vehicle about the reference axis in question.

If the device is to be used as an attitude-dependent yaw sensor, the optical system of device is preferably mounted so as to view a zenith (normal to the pitch and roll axis of the vehicle) and then senses the roll rate component of orbital rotation.

When the device is to be used as an attitude-independent yaw attitude sensor, zenith-view roll-rate and pitch-rate sensors are used. After passing through the respective reticles of these sensors (with different slit widths), light from both beams can be directed to a single detector, and the roll and pitch rate information processed on separate channels.

The electronic system required to be associated with each of the photoelectric or photomultiplier tube or tubes of each of our modifications for translating the electromagnetic pulses sensed by the latter into notations of angular displacement and rate of rotation has not been illustrated or described, for known circuits and systems can be used for this purpose.

From the above description it will be seen that we have provided various modifications of sensors for sensing the yaw attitude of a horizontally stabilized orbiting vehicle and the rate of rotation of any space vehicle about any one of its three reference axes.

We claim:

1. A device for sensing the rate of rotation of an orbiting vehicle about a fixed axis comprising: a reticle mounted on said vehicle and provided with a plurality of symmetrically disposed slits; a photomultiplier mounted on said vehicle for receiving a beam of light passing through said reticle; an optical system fixed against movement relative to said vehicle for imaging a star field and for directing a light beam from a star in said star field through said reticle and on to said photomultiplier; and means for effecting a relative oscillating non-parallel displacement between said beam and the slits of said reticle thereby to cause said photomultiplier to sense said beam of light as a rectangular wave.

2. A device of the character set forth in claim 1 wherein said fixed axis is perpendicular to said beam of light.

3. A device of the character set forth in claim 1 wherein the plane of said reticle is perpendicular to said light beam.

4. In a horizontally stabilized orbiting vehicle, a yaw attitude-sensor comprising: a supporting member; non-rotating reticle means mounted on said supporting member and provided with a plurality of spaced slits disposed in a symmetrical pattern, each adjacent pair of slits being separated by an opaque band; photomultiplier means; an optical system for directing a beam of light from a star through said reticle means on to said photomultiplier means; said optical system including a reflecting telescope provided with a primary aspheric mirror and a second aspheric mirror; and means for oscillating said second aspheric mirror on an axis paralleling said slits.

5. An orbiting-vehicle yaw attitude-sensor of the character set forth in claim 4 wherein the axis of said telescope is disposed in parallelism with the yaw axis of said vehicle.

References Cited in the file of this patent

UNITED STATES PATENTS

| | | |
|---|---|---|
| 2,425,541 | Konet | Aug. 12, 1947 |
| 2,958,135 | Lakin | Nov. 1, 1960 |
| 2,981,842 | Kaufold et al. | Apr. 25, 1961 |